Patented Oct. 24, 1922.

1,433,050

UNITED STATES PATENT OFFICE.

WILLET C. WELLS AND FRANK E. WELLS, OF COLUMBUS, OHIO.

PROCESS OF FILTERING VAPORS.

Application filed February 15, 1919. Serial No. 277,296.

*To all whom it may concern:*

Be it known that we, WILLET C. WELLS and FRANK E. WELLS, citizens of the United States, residing at Columbus, in the county of Franklin and State of Ohio, have invented certain new and useful Improvements in Processes of Filtering Vapors, of which the following is a specification.

The invention is a process of filtering the vapors of hydrocarbons evolved by passing a permanent neutral gas through heated hydrocarbon, passing said gas with its load of vapors through filtering material such as fuller's earth or its equivalent in its atomizing effect upon the vapors, whereby color and bituminous matter are removed from the condensate thereof and more pronounced crystals of wax are produced therein, and more uniform volatility of the distillates of the vapors at any given point is obtained.

Figure 1:
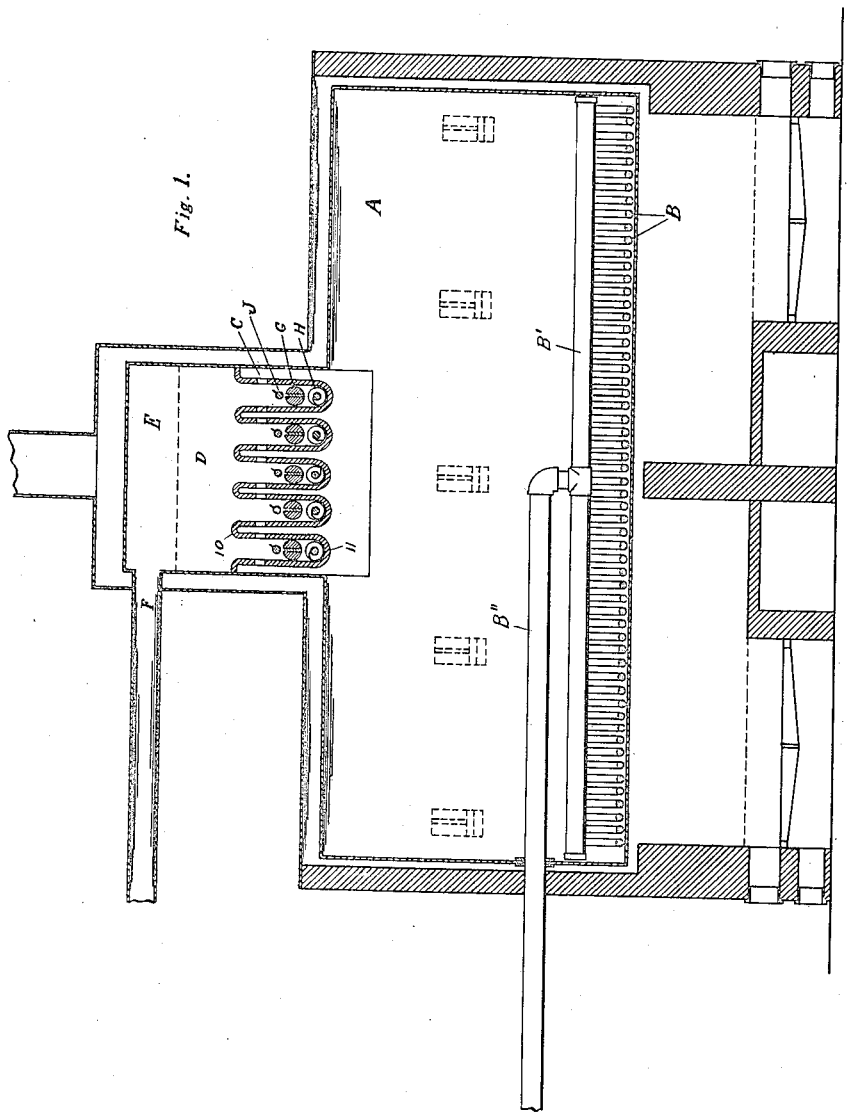
Figures 2, 3, 4, 5:
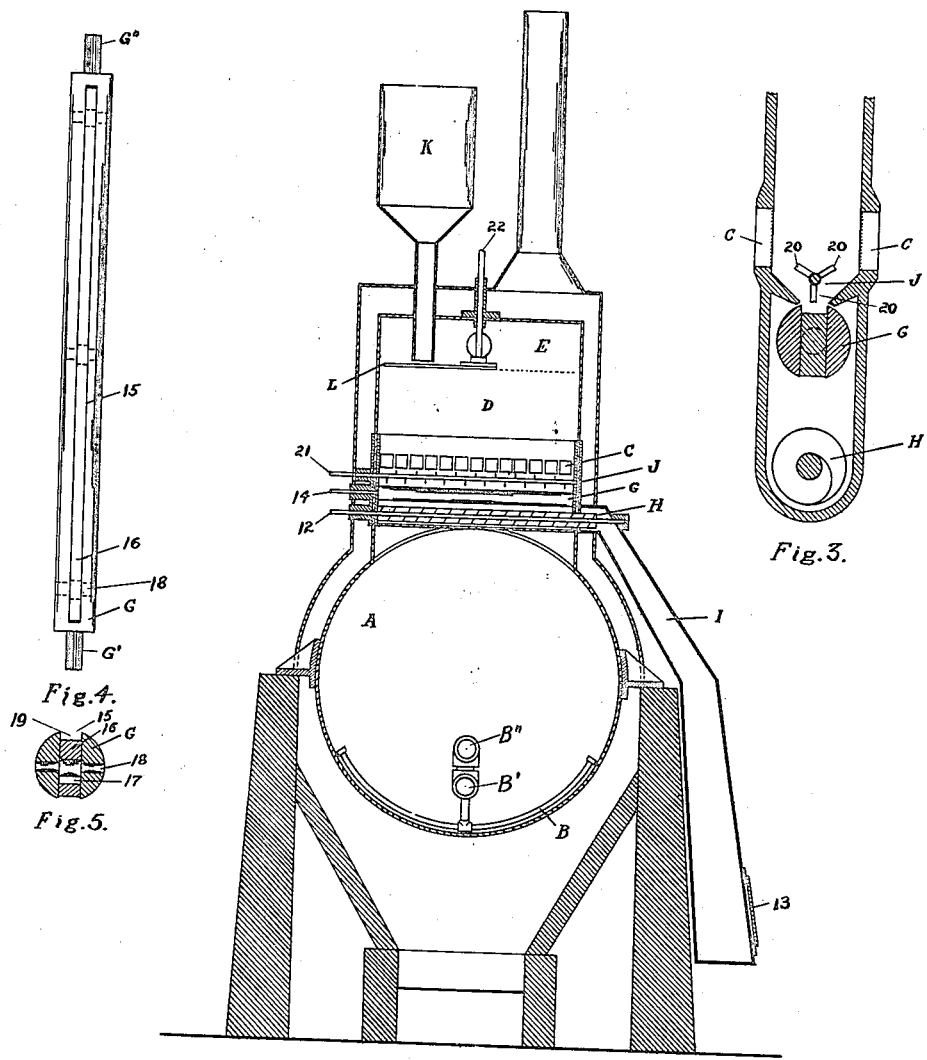

A convenient apparatus for utilizing the process is shown in the drawings which are hereto annexed and are hereby made a part of this specification; referring to which, Fig. 1 is a vertical longitudinal section of the apparatus employed; Fig. 2 is a vertical transverse section through the apparatus taken near the middle of Fig. 1; Fig. 3 is an enlarged view of one of the convolutes shown in Fig. 1 in the dome of the apparatus; Fig. 4 is one of the rolls used for the retention and discharge of the filtering material after it has become saturated in the performance of the process; Fig. 5 is a cross section of the roll shown in Fig. 4.

Referring to the drawings, A is a still in which the petroleum or substance to be evaporated is placed and which will be heated from the fire box beneath in a well known manner; disposed preferably on the bottom of the still A are pipes B containing perforations, affording communication between the pipes and the interior of the still. Said pipes communicate with the distributing pipe B' which is supplied with a permanent neutral gas through pipe B''. When the petroleum is placed in the still the gas is introduced through the pipe system described and it passes up through the body of the heated petroleum and takes up vapors therefrom. The dome E of the still is provided with a diaphragm formed in folds or convolutions 10, 11, pierced at C to admit into the dome the vapor laden gas. The folds 11 are fitted with spiral or worm conveyor H which is appropriately journaled in the walls of the dome as appears especially in Fig. 2, and projects beyond the walls to provide opportunity to apply power thereto in any well known manner, no particular means being therefore illustrated. This conveyor at its discharge end communicates with a conduit I having a door 13 near its lower end to permit the ready removal of the contents.

Likewise appropriately journaled in the walls of the dome and disposed in the loops 11 above the conveyor H is the roll or bar G; at its ends it is reduced to form the bearings G' and G'' and it projects to the outside of the dome at 14 to permit power to be applied thereto in any well known manner, not particularly illustrated therefore, by which said roll may be rotated when desired to effect a discharge upon the conveyor. In the embodiment here shown for this roll G, it is slotted longitudinally as shown at 15 in Figs. 4 and 5, and into this slot is fitted a bar 16 provided with slotted transverse openings 17 through which the pins 18 are inserted, thereby affording a limited sliding movement for the bar. Referring to Fig. 5 it is seen that the weight of the bar 16 causes it to rest on the pin 18 bearing on the upper end of the slot, which provides a kind of trough along the upper face of the roll as shown at 19. When the roll is rotated through a half circle the bar will drop upon the bearing pins and the trough will reappear on the side which is now uppermost.

Likewise journaled in the walls of the dome and disposed in the loops 11 are agitators J, being rods with pins projecting radially therefrom shown at 20; this rod also extends to the outside of the dome and power may be applied thereto in any well known manner, no particular means being shown in this instance, the extending portion appearing at 21.

Above the features just described in the dome are screened openings C through the diaphragm whereby vapors borne upwardly from the still by the gas into the loops or convolutions 10 are admitted into the dome E.

The dome is partially filled with filtering material, such as fuller's earth, supplied thereto as desired from the hopper K by means of the sweep L actuated from the outside of the dome by power applied to the extending portion 22 in any well known manner. In this instance the filtering material is shown filling the dome and settling into the loops 11 to the dotted line, the filtering material being indicated generally by the numeral D. When it is desired to discharge the filtering material from the dome the agitator J will be rotated, the roll G will be rotated, thereby carrying the trough 19, full of material, to the lower side of the roll, whereupon gravity will cause the bar 16 to drop and thereby expel the trough full of material onto the conveyor J which in its rotation will carry the material thus received from above outwardly into the conduit I and so down to the discharge opening 13. The pipe F leads away to a condenser for the vapors, not here shown.

The operation of the apparatus in carrying out our process is as follows:—

The dome E is filled with the filtering material as indicated; petroleum or other substance to be evaporated is turned into the still A, the heat is applied thereto from the furnace, and at the proper time the neutral gas is admitted through the pipes B and passes upward through the petroleum. On its ascent the gas loads itself with vapors from within the body of the liquid and carries them through the screened openings into and through the filtering material in the dome; as the filtering material receives heat solely from the gas and vapor passing therethrough it is necessarily of lower temperature than the fluid which heats it, consequently a portion of the less volatile vapors condense therein, and this condensate is absorbed in the pores of the filtering material and is retained therein until the continuously increasing temperature of the succeeding vapor evaporates it therefrom, and in so doing continuously deposits more condensate of less volatility in its stead, thus very materially narrowing the range volatility of any portion of the distillate therefrom.

By this means we obtain pure marketable products direct from the condenser, of good color, entirely free from bituminous or tarry matter, and more pronounced crystals in the wax distillate and consequently less amorphous matter or petroleum jelly, and hence producing more commercial wax of higher melting point. As the filtering material becomes filled with impurities it can be withdrawn from the dome of the still and continuously replenished by new material as shown, or otherwise cleaned or replenished.

What we claim is:—

1. The process of treating oil, which consists in heating the oil in a still, and passing a permanent neutral gas therethrough, passing the resultant mixture of vapors and gas upwardly through a filtering material which has the effect of fuller's earth in removing color and bituminous matter therefrom, said filtering material being maintained at a lower temperature than said oil, and then condensing the vapors.

2. The process of treating oil, which consists in heating the oil in a still, passing a permanent neutral gas therethrough, passing the resultant mixture of vapors and gas upwardly through a filtering material which has the effect of fuller's earth in removing color and bituminous matter therefrom, said filtering material being placed in the dome of the still, but maintained at a lower temperature than said oil, and condensing the vapors.

3. The process of treating oil, which consists in heating the oil in the still, passing a heated permanent neutral gas therethrough, passing the resultant mixture of vapors and gas upwardly through a filtering material which has the effect of fuller's earth in removing color and bituminous matter therefrom, said filtering material being maintained at a lower temperature than said oil, and then condensing the vapors.

In testimony whereof we affix our signatures in the presence of two witnesses.

WILLET C. WELLS.
FRANK E. WELLS.

Witnesses:
 GEO. W. RIGHTMIRE,
 R. M. ROYER.